(12) United States Patent
Eddings et al.

(10) Patent No.: US 9,690,100 B1
(45) Date of Patent: Jun. 27, 2017

(54) WIRELESS COMMUNICATION SYSTEM WITH A LIQUID CRYSTAL DISPLAY EMBEDDED IN AN OPTICAL LENS

(75) Inventors: Justin Clay Eddings, Eudora, KS (US); Joshua Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1354 days.

(21) Appl. No.: 13/240,713

(22) Filed: Sep. 22, 2011

(51) Int. Cl.
*G02B 27/01* (2006.01)

(52) U.S. Cl.
CPC .................. *G02B 27/017* (2013.01)

(58) Field of Classification Search
CPC .......... G02B 27/017; G02B 2027/0178; G02B 2027/014; G06F 3/011; G06F 3/017; G06F 3/013; G06F 3/012
USPC ............... 345/8, 633, 7; 349/11, 13
See application file for complete search history.

(56) References Cited

U.S. PATENT DOCUMENTS

| | | | |
|---|---|---|---|
| 4,679,918 A * | 7/1987 | Ace | G02C 7/02 351/159.62 |
| 5,003,300 A | 3/1991 | Wells | |
| 5,539,422 A | 7/1996 | Heacock et al. | |
| 6,011,653 A | 1/2000 | Karasawa | |
| 6,246,383 B1 | 6/2001 | Ophey | |
| 6,421,183 B1 | 7/2002 | Ophey | |
| 6,771,294 B1 * | 8/2004 | Pulli | G06F 3/011 345/173 |
| 6,900,851 B2 | 5/2005 | Morrison et al. | |
| 6,947,219 B1 * | 9/2005 | Ou | G02B 27/017 345/7 |
| 6,950,220 B2 | 9/2005 | Abramson et al. | |
| 7,110,164 B2 | 9/2006 | Paolini, Jr. et al. | |
| 7,301,648 B2 * | 11/2007 | Foxlin | G02B 27/017 356/620 |
| 7,791,782 B2 | 9/2010 | Paolini, Jr. et al. | |
| 7,869,128 B2 * | 1/2011 | Yamaguchi | G02B 27/0172 359/630 |
| 8,073,198 B2 * | 12/2011 | Marti | G06F 3/011 345/156 |
| 8,203,502 B1 * | 6/2012 | Chi | G02B 27/017 345/7 |
| 8,223,088 B1 * | 7/2012 | Gomez | G06F 3/03547 345/7 |
| 8,368,794 B2 * | 2/2013 | Sako | G06F 3/011 345/8 |
| 8,405,610 B1 * | 3/2013 | Cole | G06F 3/013 345/158 |
| 2003/0214697 A1 | 11/2003 | Duthaler et al. | |

(Continued)

*Primary Examiner* — Ibrahim Khan (57) ABSTRACT

A wireless communication system includes a transparent lens system coupled to a frame that positions the lens system in front of a user's eye when the frame is mounted on the user's head. A wireless transceiver wirelessly receives display control signals and transfers the display control signals to an LCD system that is embedded within the transparent lens system. The LCD system renders images and transparency in response to the display control signals. In some examples, an optical receiver transfers the optical information signals to the wireless transceiver, and the transceiver wirelessly transfers the optical information signals. In some examples, a wireless communication device wirelessly transfers the display control signals and receives the optical information signals.

18 Claims, 5 Drawing Sheets

(56) References Cited

U.S. PATENT DOCUMENTS

| | | | |
|---|---|---|---|
| 2004/0257635 A1 | 12/2004 | Paolini, Jr. et al. | |
| 2006/0052146 A1* | 3/2006 | Ou | H04M 1/05 455/575.2 |
| 2006/0061544 A1* | 3/2006 | Min | G02B 27/0093 345/156 |
| 2006/0132382 A1* | 6/2006 | Jannard | G02C 11/06 345/8 |
| 2008/0136775 A1* | 6/2008 | Conant | G06F 3/017 345/156 |
| 2008/0266323 A1* | 10/2008 | Biocca | G06F 3/014 345/633 |
| 2010/0053121 A1 | 3/2010 | Sprague | |
| 2010/0079356 A1* | 4/2010 | Hoellwarth | G02B 27/017 345/8 |
| 2010/0103078 A1* | 4/2010 | Mukawa | G02B 27/0172 345/8 |
| 2010/0220037 A1* | 9/2010 | Sako | A63F 13/12 345/8 |
| 2010/0265561 A1 | 10/2010 | Gates et al. | |
| 2011/0007035 A1* | 1/2011 | Shai | G06F 3/014 345/179 |
| 2011/0205242 A1* | 8/2011 | Friesen | G06F 3/011 345/633 |
| 2012/0062445 A1* | 3/2012 | Haddick | G02B 27/017 345/8 |
| 2012/0154557 A1* | 6/2012 | Perez | H04N 21/25891 348/53 |
| 2012/0249591 A1* | 10/2012 | Maciocci | G06F 3/011 345/633 |
| 2012/0293548 A1* | 11/2012 | Perez | G06F 3/012 345/633 |
| 2013/0016033 A1* | 1/2013 | Latta | G06F 3/011 345/8 |

* cited by examiner

WIRELESS COMMUNICATION SYSTEM WITH A LIQUID CRYSTAL DISPLAY EMBEDDED IN AN OPTICAL LENS

TECHNICAL BACKGROUND

A Liquid Crystal Display (LCD) renders graphic images for a variety of user devices. For example, LCDs are used in computers, telephones, game consoles, and other types of user devices. The pixels in an LCD are formed by a layer of liquid crystal molecules that are disposed between two transparent electrode layers. These liquid crystal and electrode layers are positioned between polarization filter layers. A minor or backlight layer is positioned at the bottom. In a backlit system, the layers are controlled to selectively pass or block the backlighting to render an image to the viewer. In a mirrored system, the layers are controlled to selectively block incident light or selectively allow reflected light to render the image to the viewer. The polarization of the two filter layers is orthogonal to effectively block the passage of light. The electrode layers control the orientation of the liquid crystal molecules that modifies the polarization of the light and enables the light to pass through the filters to the viewer.

An augmented reality system utilizes various display technologies to super-impose information on a view of the real-world. Augmented reality may be implemented in a heads-up display that can be worn by a user. For example, military personnel may wear a helmet that displays augmented information on the eye-shield.

A smartphone allows a user to wirelessly communicate over wide-area networks and over local wireless links. For example, the smartphone may communicate over a Long-Term Evolution (LTE) link with a large communication network and over a Bluetooth link with an earpiece worn by the user. The smartphone also executes applications that provide user services, such as gaming, messaging, and augmented reality.

OVERVIEW

A wireless communication system includes a transparent lens system coupled to a frame that positions the lens system in front of a user's eye when the frame is mounted on the user's head. A wireless transceiver wirelessly receives display control signals and transfers the display control signals to an LCD system that is embedded within the transparent lens system. The LCD system renders images and transparency in response to the display control signals. In some examples, an optical receiver transfers the optical information signals to the wireless transceiver, and the transceiver wirelessly transfers the optical information signals. In some examples, a wireless communication device wirelessly transfers the display control signals and receives the optical information signals.

DETAILED DESCRIPTION

Figure 1:
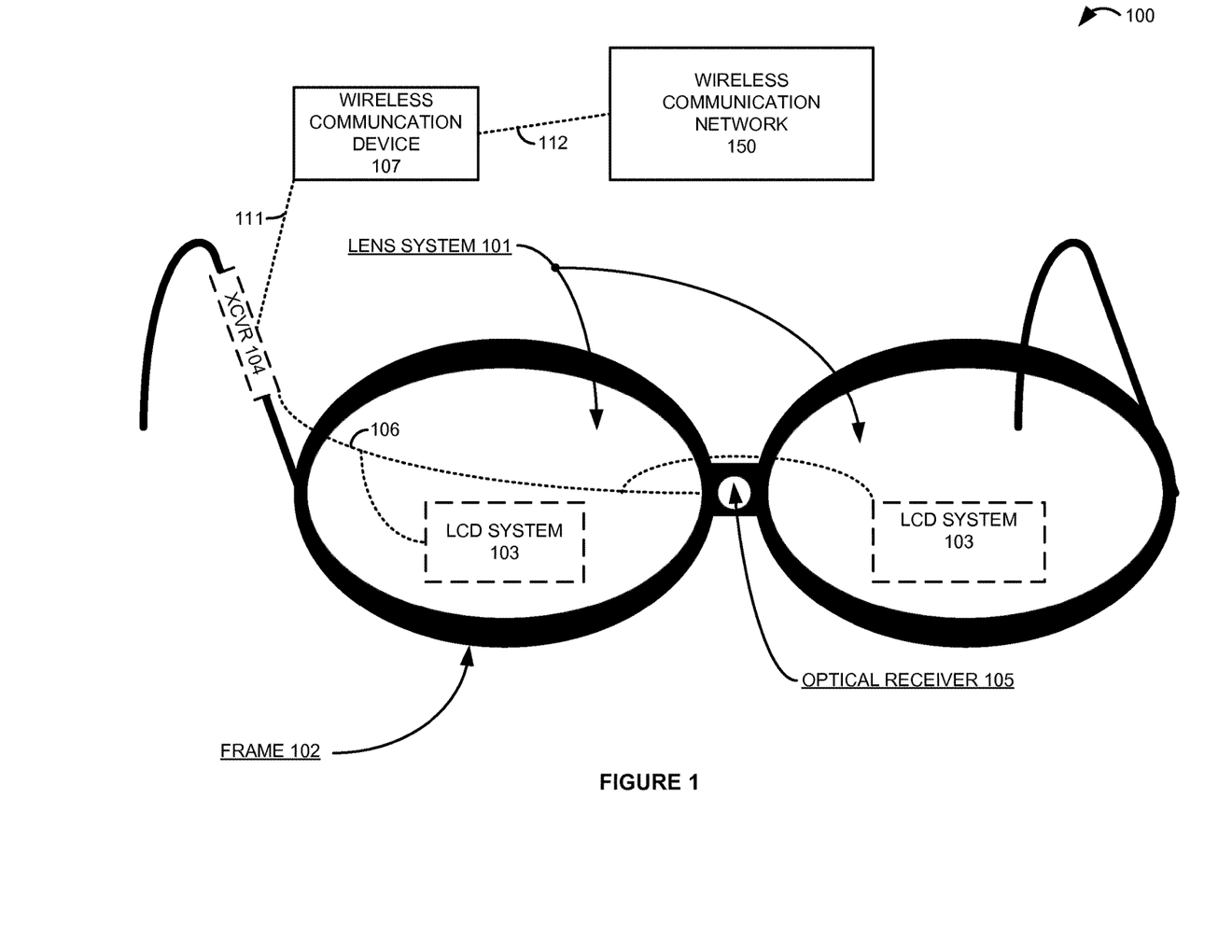
FIG. 1 illustrates a wireless communication system with LCD capability embedded in an optical lens.

FIG. 1 illustrates wireless communication system 100. Wireless communication system 100 comprises: lens system 101, frame 102, Liquid Crystal Display (LCD) system 103, wireless transceiver 104, optical receiver 105, signal links 106, and wireless communication device 107. Wireless transceiver 104 and wireless communication device 107 communicate over local wireless link 111. Wireless communication device 107 and wireless communication network 150 communicate over network wireless link 112.

Lens system 101 comprises one or more transparent materials, such as glass, plastic, or some other see-through material. Some examples of lens system 100 include eyeglass lenses, face shields, heads-up displays. In some examples, lens system 101 comprises a pair of glass lenses configured for vision correction and suitable for frame mounting. In some examples, lens system 101 uses a bi-focal configuration where LCD system 103 is positioned in one of the bi-focal sections but not the other. LCD system 103 and signal links 106 are embedded within lens system 101. Other components in communication system 100 could be totally or partially embedded within lens system 101 as well. Although FIG. 1 illustrates an "eyeglass version" of lens system 101, please note that lens system 101 may comprise a different number of lenses that may also vary in shape.

Frame 102 comprises a mounting structure for lens system 101, wireless transceiver 104, and optical receiver 105. Several different materials could be used for frame 102, such as plastic, wood, ceramic, metal, glass, and the like. Frame 102 is configured to fit the head and/or body of the user and position lens system 101 in front of the user's eyes. Although FIG. 1 illustrates an "eyeglass version" of frame 102, note that frame 102 may comprise various shapes and configurations.

LCD system 103 is transparently embedded within lens system 101. Typically, LCD system 103 is positioned as a layer in or on the lens material. This LCD layer may extend across various portions of the lens and occupy various different locations. LCD system 103 comprises various layers of polarization filters, transparent electrodes, and liquid crystal molecules. Based on the electrode charging scheme, each pixel of molecules may be independently controlled to produce an array of images in various colors, such as black, grey, or blue.

Note that LCD system 103 omits a backlight to provide transparency when not rendering images. In addition, LCD system 103 omits a reflective backing to provide transparency when not rendering images. Thus, LCD system 103 is modified from conventional systems to provide a see-through configuration. In some examples, LCD system 103 is distributed across lens system 101, and may be controlled to filter ultraviolet light. In these, examples, system 100 may be configured to shield the user's eyes from ultraviolet radiation.

In configurations such as the "eye-glass version" shown, LCD system 103 is configured to provide a short-range focus capability to the human eye. Thus, LCD system 103 may implement digital logic to enable the user to bring an image into their visual foreground by focusing the image. The digital logic also enables the user to defocus the image and allow them to look through the image and focus on other objects.

LCD system 103 is configured to generate images with graduated color that allows an image to be rendered at dynamically controllable saturation and brightness levels. Thus, LCD system 103 renders images at controllable levels of opaqueness to enable the user to bring up a full color version of the image or to fade the image with simple instructions.

Wireless transceiver 104 is connected to or embedded within frame 102, and transceiver 104 may be at least partially embedded within lens system 101. Wireless transceiver 104 comprises communication and power circuitry. The communication circuitry includes an antenna, amplifier, filter, modulator, processor, memory, and software for wireless communication over local wireless link 111. The communication circuitry also includes a processor, memory, software, and an electronic or optical communication port for signal transfer over signal links 106. The power circuitry includes a battery, solar cell, kinetic generator, or some other power source. The power circuitry also includes an electronic coupling for power transfer over signal links 106. Although wireless transceiver 104 has an intelligent capability (processing, memory, software), it primarily operates as a wireless communication interface and power source for LCD system 103 and optical receiver 105.

Optical receiver 105 is connected to or embedded within frame 102, and may be at least partially embedded within lens system 101. Optical receiver 105 comprises a lens or other optical interface that directs light to a recording medium. The recording medium converts the received optical energy into representative optical or electronic data signals. In some examples, optical receiver 105 comprises a CCD or CMOS imaging chip. Optical receiver 105 typically detects electromagnetic energy in the visible spectrum, although optical receiver 105 may also detect ultraviolet, infrared, or energy in another portion of the electromagnetic spectrum.

Signal links 106 couple wireless transceiver 104 with LCD system 103 and with optical receiver 105. The paths taken by signal links 106 on FIG. 1 are merely representative, and various paths taking different routes within lens system 101 and/or frame 102 could be used. Signal links 106 comprise data and power transfer media that is embedded in lens system 101 and frame 102. The data transfer media might comprise metal, glass, plastic, or air. Various data transfer protocols could be used. The power transfer media might comprise metal or air (if capacitive or near-field power couplings are used). The power is typically microvoltage DC. FIG. 1 illustrates an "eyeglass version" of frame 102, but frame 102 may take on various shapes and configurations in other examples.

Wireless communication device 107 comprises a computer, phone, internet appliance, game console, media player, or some other user communication device. Wireless communication device 107 comprises wireless communication interfaces, processing circuitry, memory, software, and user interfaces. Wireless communication device 107 is configured to generate and transfer control signals to LCD system 103 to drive LCD image displays on lens system 101. Wireless communication device 107 is also configured to receive and process optical data from optical receiver 105 to determine user instructions and/or ascertain the visual environment surrounding wireless communication system 100.

Local wireless link 111 uses Bluetooth, Wi-Fi, or some other protocol for relatively short-range wireless communication.

Wireless communication network 150 comprises a wide area communication network with various wireless access points. Network wireless link 112 uses Code Division Multiple Access (CDMA), Global System for Mobile communications (GSM), Universal Mobile Telecommunications System (UMTS), High-Speed Packet Access (HSPA), Evolution-Data Optimized (EV-DO), Long Term Evolution (LTE), Worldwide Interoperability for Microwave Access (WiMAX) or some other wide-area communication protocol. In alternative examples, wireless communication link 112 and wireless communication network 150 are omitted altogether. In other alternatives, wireless communication link 112 and wireless communication network 150 and are replaced by a land-line and Internet service provider.

Figure 2:
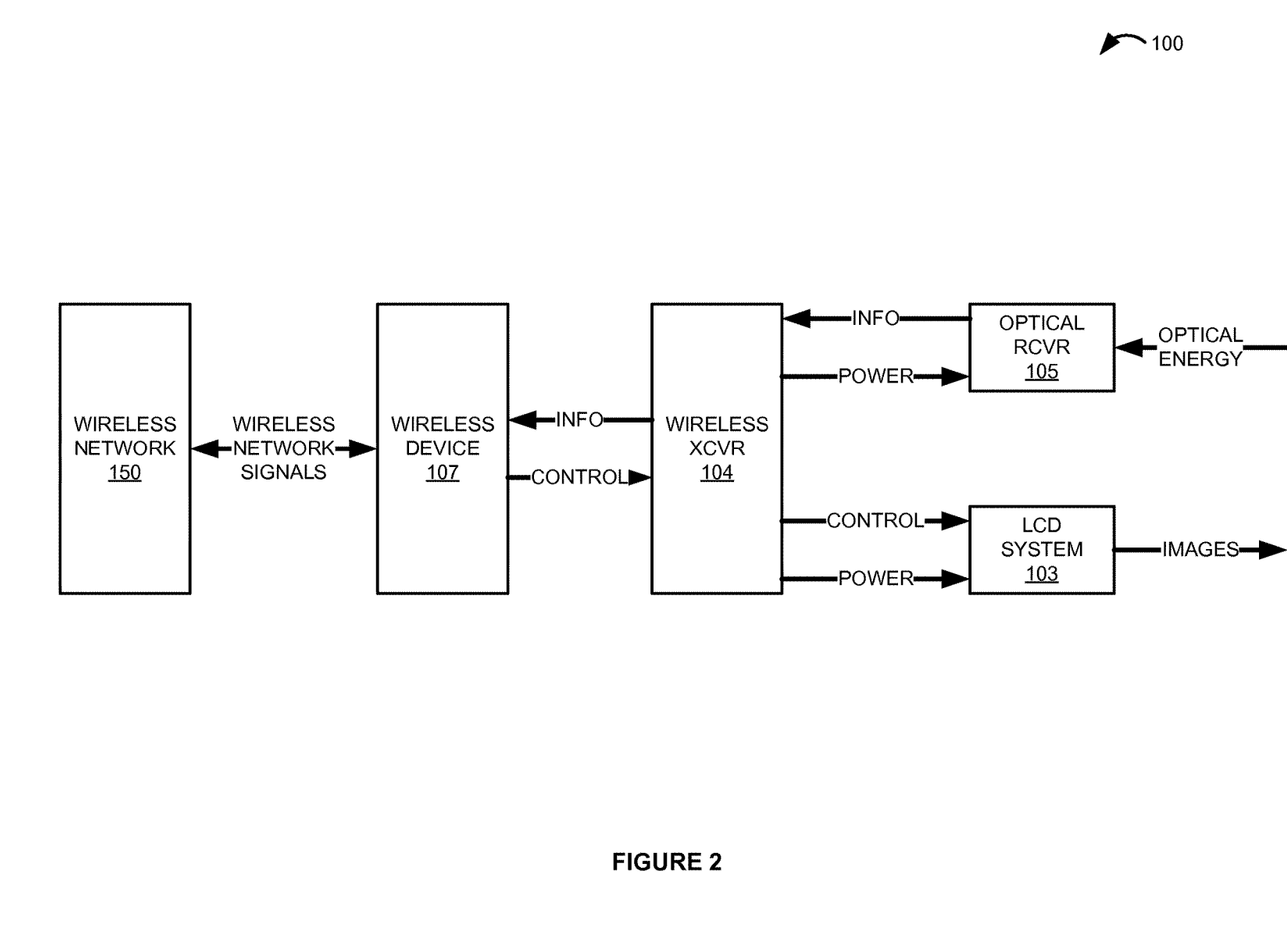
FIG. 2 illustrates the wireless communication system with LCD capability embedded in the optical lens.

FIG. 2 further illustrates wireless communication system 100. Wireless communication network 150 and wireless communication device 107 exchange wireless network signals. Wireless network signals may carry user messages, video data, web pages, augmented reality information, gaming data, or some other user communication. Wireless communication device 107 processes the wireless network signals, its own operator instructions, and optical information from optical receiver 105 to generate control signals that traverse wireless transceiver 104 to LCD system 103. Wireless transceiver 104 also transfers power to LCD system 103. LCD system 103 renders images in response to the control signals. The images indicate the user messages, video data, augmented reality information, gaming data, web pages, or some other user communication.

Optical receiver 105 receives and converts optical energy (or other photonic energy) into corresponding optical information signals that are transferred to wireless communication device 107 over wireless transceiver 104. Wireless communication device 107 may process the optical information from optical receiver 105 for various purposes. In some examples, device 107 processes the optical information to detect user instructions for applications such as gaming, messaging, web browsing, and the like. In other examples, device 107 processes the optical information to present suitable augmented reality information through LCD system 103.

Figure 3:
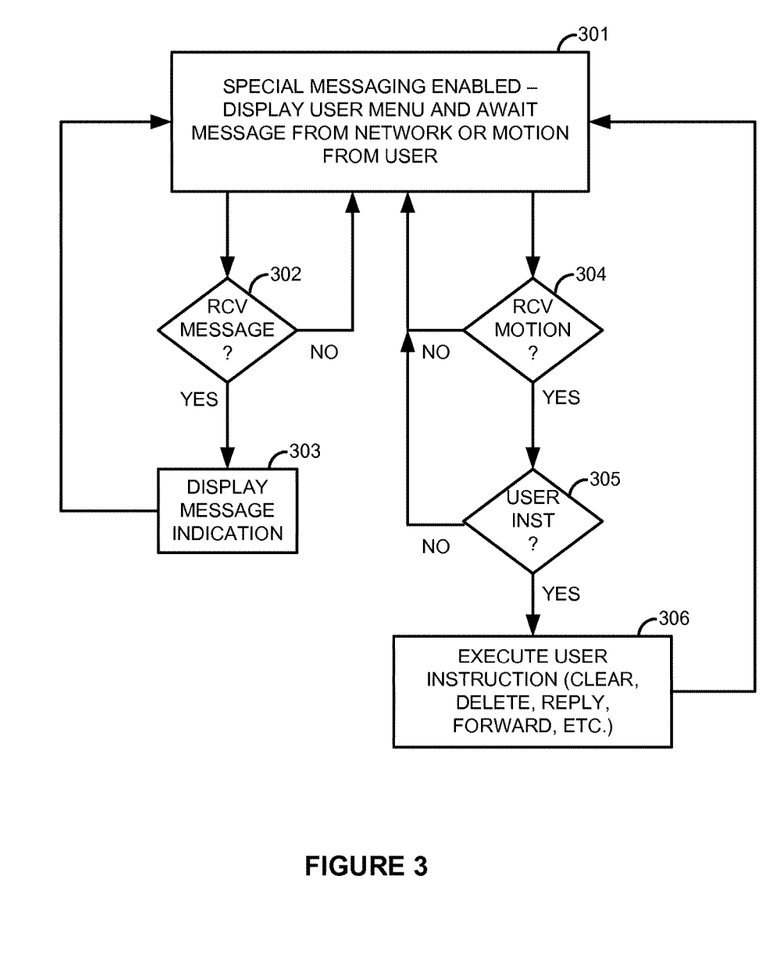
FIG. 3 illustrates the operation of the wireless communication system with LCD capability embedded in the optical lens to facilitate a wireless network messaging service.

FIG. 3 illustrates the operation of wireless communication system 100 to facilitate a wireless network messaging service. Prior to operation, the user places frame 102 on their head, enables the messaging service on wireless communication device 107, and powers on wireless transceiver 104. In response, wireless communication device 107 drives LCD system 103 to render a user menu (301). The user menu typically includes a simple set of messaging and display options. Wireless communication device 107 also awaits a message from wireless communication network 150 or an instruction from the user through either wireless communication device 107 or optical receiver 105 (301).

If wireless communication device 107 receives a message from wireless communication network 150 (302), then device 107 drives LCD system 103 to display a message indication (303). The indication could be an icon indicating a pending message, the name of the sender, a crawl of the message, and/or some information related to the message.

If wireless communication device 107 receives motion data from optical receiver 105 (304), then device 107 processes the motion data to determine if it represents a user instruction (305). For example, a swipe of the users hand from right-to-left might represent a user instruction to remove the user menu or the message indication from the display. In another example, the clasping of the user's hands together could represent a user instruction to delete the message from the inbox. In yet another example, an open right palm may represent a user instruction to crawl the entire message on the display while a flip to the back of the right hand represents a user instruction to stop the crawl.

If wireless communication device 107 determines that the motion represents a user instruction (305), then wireless communication device executes the instruction (306). It should be appreciated that several user instructions could be provided in this manner including messaging instructions such as: clear, reply, forward, delete, and the like. Likewise, user display instructions might control brightness, focus, content, and the like.

Figure 4:
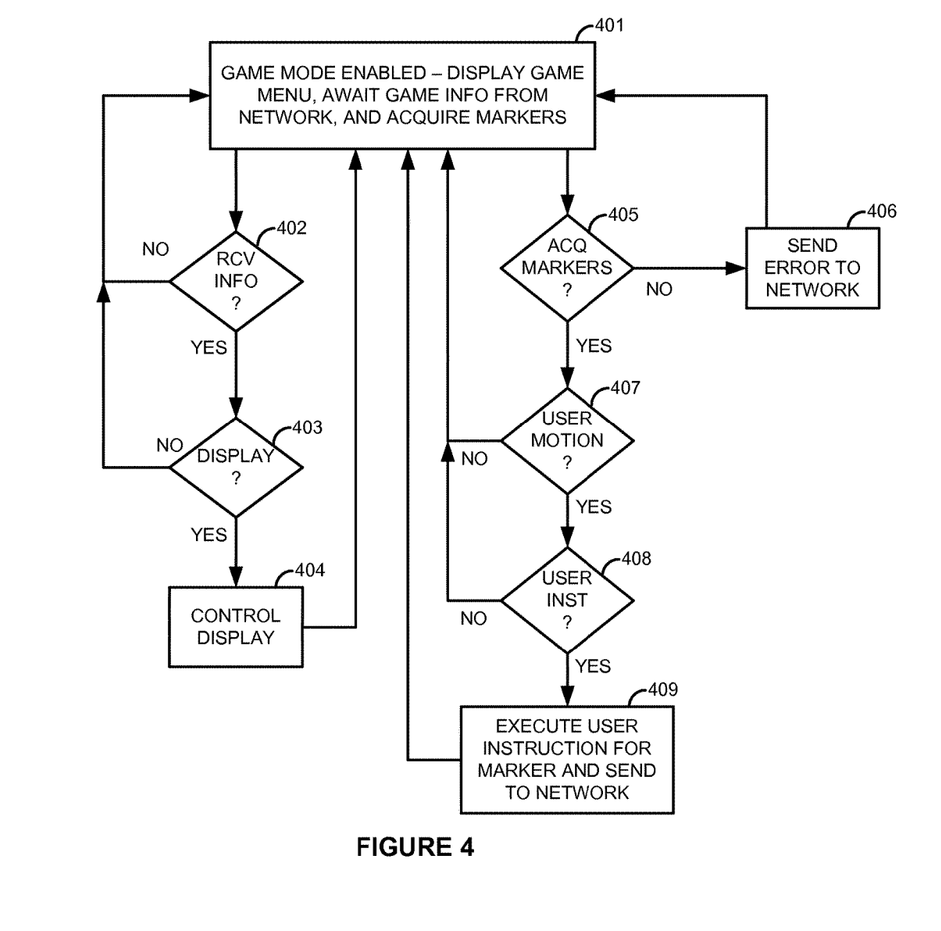
FIG. 4 illustrates the operation of the wireless communication system with LCD capability embedded in the optical lens to facilitate a wireless network gaming service.

FIG. 4 illustrates the operation of wireless communication system 100 to facilitate a wireless network gaming service. Prior to operation, the user marks specific fingers with optical markers. The optical markers could be symbols, such as squares, triangles, and the like. The optical markers could be colors, such as red and green. The optical markers could be wearable products such as rings, adhesive tape, stickers, and fingernail polish. Various combinations of colors, shapes, and accessories could be used. In addition, the user places frame 102 on their head, enables the gaming service on wireless communication device 107, and powers on wireless transceiver 104.

In response to the gaming mode, wireless communication device 107 drives LCD system 103 to render a game menu (401). The game menu typically includes a simple set of game and display options. Wireless communication device 107 awaits gaming information from wireless communication network 150 (401). Also, wireless communication device 107 attempts to acquire the optical markers on the user's fingers (401). If the optical markers are not acquired within an acquisition time period, then wireless communication device 107 transfers an error message to wireless communication network (406).

If wireless communication device 107 receives game information from wireless communication network 150 (402), then device 107 determines if the game information affects LCD display 103 (403). If the game information affects LCD display 103 (403), then wireless communication device 107 drives LCD system 103 to render the corresponding image (404) as directed by the game information. The game image could be menus, players, time, and actual game action and graphics.

If wireless communication device 107 receives motion data from optical receiver 105 (407), then device 107 processes the motion data to determine if it represents a user instruction. For example, the movement of a finger with a red fingernail polish might represent one type of game input while the movement of a different finger with blue fingernail polish might represent another type of game input. If wireless communication device 107 determines that the user motion represents a user instruction (408), then wireless communication device executes the instruction (409) which may include transferring the input to a gaming server over wireless communication network 150.

Figure 5:
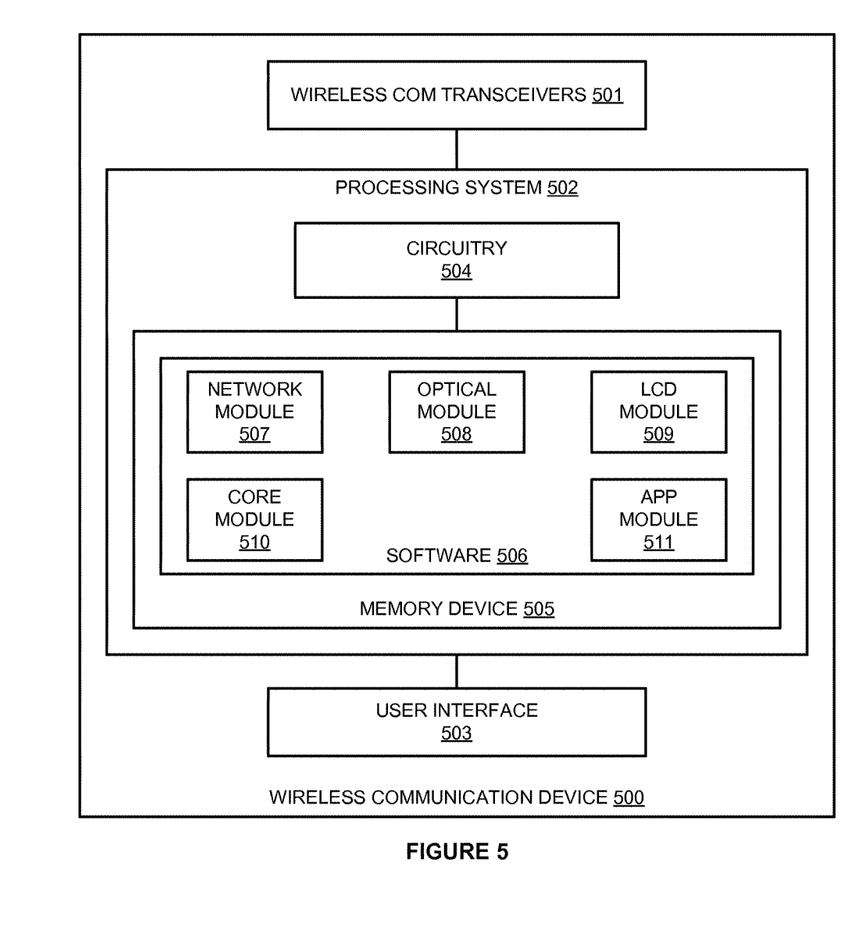
FIG. 5 illustrates a wireless communication device for a wireless communication system with LCD capability embedded in an optical lens.

FIG. 5 illustrates wireless communication device 500. Wireless communication device 500 provides an example of wireless communication device 107, although device 107 could use alternative configurations. Wireless communication device 500 comprises wireless communication transceivers 501, processing system 502, and user interface 503. Processing system 502 is linked to wireless communication transceivers 501 and user interface 503. Processing system 502 includes processing circuitry 504 and memory device 505 that stores operating software 506. Operating software 506 comprises software modules 507-511. Wireless communication device 500 may include other well-known components such as a battery and enclosure that are not shown for clarity. Wireless communication device 500 may comprise a telephone, computer, e-book, mobile Internet appliance, media player, game console, wireless network interface card, or some other wireless communication apparatus—including combinations thereof.

Wireless communication transceivers 501 comprise RF communication circuitry and antennas for both wide area and local area networks. The RF communication circuitry typically includes an amplifier, filter, RF modulator, and signal processing circuitry. Wireless communication transceivers 501 may also include a memory device, software, processing circuitry, or some other communication components. Wireless communication transceivers 501 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Wireless communication transceivers 501 include one long-range transceiver to exchange network communication signals with a wireless access point in a wide area network and another short-range transceiver to exchange local control and information signals with equipment worn or carried by the user.

User interface 503 comprises components that interact with a user to receive user inputs and to present media and/or information. User interface 503 may include a speaker, microphone, buttons, lights, display screen, touch screen, touch pad, scroll wheel, communication port, or some other user input/output apparatus—including combinations thereof. User interface 503 receives user instructions to enable modes that utilize additional control and information equipment that is worn or carried by the user as described herein.

Processing circuitry 504 comprises microprocessor and other circuitry that retrieves and executes operating software 506 from memory device 505. Memory device 505 comprises a non-transitory storage medium, such as a disk drive, flash drive, data storage circuitry, or some other memory apparatus. Processing circuitry 504 is typically mounted on a circuit board that may also hold memory device 505 and portions of communication transceivers 501 and user interface 503. Operating software 506 comprises computer programs, firmware, or some other form of machine-readable processing instructions. Operating software 506 may include an operating system, utilities, drivers, network interfaces, applications, or some other type of software. In this example, operating software 506 comprises software modules 507-511, although software 506 could have alternative configurations in some examples.

When executed by processing circuitry 504, network module 507 directs processing system 502 to communicate over a wide area network to support the operations of application module 511. When executed by processing circuitry 504, optical module 508 directs processing system 502 to receive and format incoming optical information for use by application module 511. When executed by processing circuitry 504, LCD module 509 directs processing system 502 to generate display control signals to drive an LCD display as required by application module 511. When executed by processing circuitry 504, core module 510 directs processing system 502 to provide application module 511 with an operational interface to modules 507-509. When executed by processing circuitry 504, application module 511 directs processing system 502 to process the formatted optical information to recognize user motions that represent user instructions. In addition, application module 511 directs processing system 502 to generate LCD display requirements. Application module 511 directs processing system 502 to communicate with remote servers over a wide area network. Application module 511 also directs processing system 502 to perform some type of user service, such as gaming, messaging, augmented reality, or the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication system comprising:
    a transparent lens system;
    a frame coupled to the transparent lens system and configured to position the transparent lens system in front of at least one eye of a user when the frame is mounted on a head of the user;
    a Liquid Crystal Display (LCD) system embedded within the transparent lens system and configured to render images and transparency in response to display control signals, wherein the LCD system is further configured without backlighting and without reflective backing; and
    a wireless transceiver configured to wirelessly receive the display control signals and to transfer the display control signals to the LCD system.

2. The wireless communication system of claim 1 wherein the LCD system is configured to filter ultraviolet rays.

3. The wireless communication system of claim 1 further comprising:
    an optical receiver configured to receive optical energy, convert the optical energy into optical information signals, and transfer the optical information signals to the wireless transceiver; and wherein
    the wireless transceiver is configured to receive the optical information signals and to wirelessly transfer the optical information signals.

4. The wireless communication system of claim 3 further comprising:
    a wireless communication device configured to wirelessly exchange network communication signals with a wireless communication network, wirelessly transfer the display control signals, wirelessly receive the optical information signals; and
    the wireless communication device further configured to process the network communication signals to generate at least a portion of the display control signals, and to process the optical information signals to generate at least a portion of the network communication signals.

5. The wireless communication system of claim 4 wherein the wireless communication device is configured to process the optical information signals to control operation of the wireless communication device based on user motion indicated in the optical information signals.

6. The wireless communication system of claim 5 wherein:
    the network communication signals indicate user messages;
    the display control signals indicate the user messages;
    the user motion and the optical information signals indicate user instructions for the user messages.

7. The wireless communication system of claim 5 wherein:
    the user marks different portions of their body with different symbols;
    the symbols, the user motion, and the optical information signals indicate user instructions for the operation of the wireless communication device.

8. The wireless communication system of claim 7 wherein the operation of the wireless communication device comprises a game.

9. The wireless communication system of claim 1 wherein the transparent lens system comprises two lenses configured for user vision correction.

10. A wireless communication system comprising:
    a transparent lens system;
    a frame coupled to the transparent lens system and configured to position the transparent lens system in front of at least one eye of a user when the frame is mounted on a head of the user;
    a Liquid Crystal Display (LCD) system embedded within the transparent lens system and configured to render images and transparency in response to display control signals, wherein the LCD system is further configured without a backlighting and without reflective backing;
    an optical receiver configured to receive optical energy, convert the optical energy into optical information signals, and transfer the optical information signals to the wireless transceiver; and
    a wireless transceiver configured to wirelessly receive the display control signals and to transfer the display control signals to the LCD system and to receive the optical information signals and to wirelessly transfer the optical information signals;
    a wireless communication device configured to wirelessly exchange network communication signals with a wireless communication network, wirelessly transfer the display control signals, and wirelessly receive the optical information signals.

11. The wireless communication system of claim 10 wherein the LCD system is configured to filter ultraviolet rays.

12. The wireless communication system of claim 10 wherein the wireless communication device is configured to process the network communication signals to generate at least a portion of the display control signals, and to process the optical information signals to generate at least a portion of the network communication signals.

13. The wireless communication system of claim 12 wherein the wireless communication device is configured to process the optical information signals to control operation of the wireless communication device based on user motion indicated in the optical information signals.

14. The wireless communication system of claim 13 wherein:
    the network communication signals indicate user messages;
    the display control signals indicate the user messages;
    the user motion and the optical information signals indicate user instructions for the user messages.

15. The wireless communication system of claim 14 wherein:
    the user marks different portions of their body with different symbols;

the symbols, the user motion, and the optical information signals indicate user instructions for the operation of the wireless communication device.

16. The wireless communication system of claim 15 wherein the operation of the wireless communication device comprises a game.

17. The wireless communication system of claim 10 wherein the transparent lens system comprises two lenses configured for user vision correction.

18. A method of operating a wireless communication system comprising:
- in an optical receiver, receiving optical energy, converting the optical energy into optical information signals, and transferring the optical information signals to a wireless transceiver;
- in the wireless transceiver, receiving the optical information signals and wirelessly transferring the optical information signals to a wireless communication device, and wirelessly receiving display control signals from the wireless communication device and transferring the display control signals to a Liquid Crystal Display (LCD) system further configured without backlighting and without reflective backing;
- in the LCD system, rendering images and transparency in response to the display control signals, wherein the LCD system is embedded within a transparent lens system coupled to a frame that positions the transparent lens system in front of at least one eye of a user when the frame is mounted on a head of the user; and
- in a wireless communication device, wirelessly exchanging network communication signals with a wireless communication network, processing the network communication signals to generate at least a portion of the display control signals, wirelessly transferring the display control signals to the wireless transceiver, wirelessly receiving the optical information signals from the wireless transceiver, and processing the optical information signals to generate at least a portion of the network communication signals.

* * * * *